United States Patent [19]
Bell et al.

[11] Patent Number: 5,338,809
[45] Date of Patent: Aug. 16, 1994

[54] CHEWING GUM OR CONFECTION CONTAINING FLAVORANT ADSORBED ON SILICA

[75] Inventors: Joseph W. Bell, Bethlehem, Pa.; Thomas J. Carroll, Oak Ridge, N.J.

[73] Assignee: Nabisco, Inc., Parsippany, N.J.

[21] Appl. No.: 4,873

[22] Filed: Jan. 19, 1993

[51] Int. Cl.⁵ ................................. A23G 3/30
[52] U.S. Cl. ........................... 426/5; 426/96; 426/650; 426/651
[58] Field of Search ................. 426/3–6, 426/650, 651, 96

[56] References Cited

U.S. PATENT DOCUMENTS

| | | | |
|---|---|---|---|
| 2,330,571 | 9/1943 | Flint | 426/3 |
| 2,525,072 | 10/1950 | Kearby | 426/3 |
| 3,397,065 | 8/1968 | Cunningham | 426/609 |
| 3,505,080 | 4/1970 | Cullen | 426/651 |
| 3,920,849 | 11/1975 | Marmo et al. | 426/3 |
| 3,930,026 | 12/1975 | Clark | 426/3 |
| 4,001,438 | 1/1977 | Marmo et al. | 426/5 |
| 4,375,483 | 3/1983 | Shuford et al. | 426/330.6 |
| 4,485,118 | 11/1984 | Carroll et al. | 426/3 |
| 4,513,012 | 4/1985 | Carroll et al. | 426/3 |
| 4,963,369 | 10/1990 | Song et al. | 426/5 |
| 4,978,537 | 12/1990 | Song | 426/5 |
| 5,128,155 | 7/1992 | Song et al. | 426/5 |
| 5,133,977 | 7/1992 | Patel | 426/3 |

OTHER PUBLICATIONS

Bolton, T. A. et al., "The Oxidative Stability and Retention of a Limonene-Based Model Flavor Plated on Amorphous Silica and Other Selected Carriers", in Perfumer & Flavorist, vol. 17, No. 2 (Mar./Apr. 1992).

*Primary Examiner*—Jeanette Hunter

[57] ABSTRACT

Chewing gum and confections containing a flavoring component in which the flavorant is releasably adsorbed on finely divided amorphous silica and encapsulated.

20 Claims, No Drawings

CHEWING GUM OR CONFECTION CONTAINING FLAVORANT ADSORBED ON SILICA

BACKGROUND OF THE INVENTION

The present invention relates to chewing gums and other confections. It relates in particular to gums and candy containing flavorants, and particularly flavorants of natural or artificial origin. The invention relates more particularly to gums and candy having a particular flavoring component which comprises a specially prepared combination of flavorant and adsorbent.

The pertinent literature describes gum formulations in which the flavorant is entrapped, encapsulated, impregnated within porous microbeads or is otherwise physically surrounded. One example is U.S. Pat. No. 5,128,155 which describes a chewing gum having a flavor releasing composition comprising a cellulosic material, a silica and a flavoring agent. The cellulosic material or other thermoplastic or thermosetting material is required by this patent to be present in the core which contains the flavoring agent. Thus, the constituent embodying the flavoring agent comprises several ingredients which are otherwise inert to the gum. The cellulosic or equivalent material, particularly when present simultaneously with silica in the gum, poses the risk of detracting from the desirable texture when chewed. This aspect seriously undermines the attractiveness of the purported advantage described in U.S. Pat. No. 5,128,155, since a gum which is gritty or otherwise has an unattractive texture in the mouth will not be purchased regardless of how the flavor is presented in the gum.

U.S. Pat. No. 4,001,438 discloses flavor compositions useful in chewing gums. Here, also, the flavoring component requires the presence of a solid suspending agent such as colloidal silica, xanthin gum or ethyl cellulose. Thus, the flavor-bearing constituent to be incorporated into the gum is required by this patent to be composed of a multiplicity of ingredients which do not otherwise contribute to the desirable characteristics of the gum such as texture or flexibility.

U.S. Pat. No. 4,963,369 discloses a chewing gum in which flavor ingredients are impregnated into porous polymeric beads. This patent is yet another example of gum formulations containing components in which the flavoring ingredient is physically trapped.

Those familiar with the manufacture of chewing gums and confections are aware that flavoring agents can be vulnerable to gradual degradation in finished products. This degradation can even be accelerated through mediation by one or more other ingredients present in the product. By "mediation" is meant that the presence of such other ingredient(s) in the form in which it or they are present appears to accelerate the decomposition of the flavorant, regardless of whether the mechanism of decomposition is chemical reaction, catalysis of reaction with other components, oxidation, or otherwise. The products which have the potential for mediating the degradation of the flavorants include sweeteners or other agents whose presence is obviously desirable in the final product. Past attempts to prevent or retard degradation of the flavorants have generally involved physically separating or isolating the flavorants within the formulation, by means such as encapsulation or other physical entrapment mechanisms, in order to enable the flavorants present to contribute as fully as desired to the flavor of the final product.

It is also recognized in this art that the consumer's perception of the flavorant(s) upon chewing is important to the acceptance of the gum or confection by the consumer. Attributes including the initial impact of flavor upon the onset of chewing, and the extension of duration of the flavor during chewing, are particularly important, the latter even more so than the former. Achieving a desirable balance of both properties is a challenge, particularly since it is frequently found that techniques which enhance one such property do so to the detriment of the other.

Thus, there is a need for chewing gum and confection compositions which satisfy the objectives of exhibiting a sufficient degree of flavor extension and initial flavor impact while protecting, and even enhancing, the stability of the flavorants present.

BRIEF SUMMARY OF THE INVENTION

The present invention meets the aforementioned objectives as well as other desired characteristics that will be apparent.

In one aspect, the present invention comprises a chewing gum comprising a gum base, a flavoring component, and optionally a sweetening component, wherein the flavoring component consists of one or more flavorants adsorbed releasably on finely divided silica, and wherein the sweetening component optionally comprises one or more sweeteners adsorbed releasably on finely divided silica.

Another aspect of the invention is an improved method of making chewing gum by combining in any sequence gum base, a flavoring component and, optionally, a sweetening component, wherein the improvement comprises using as the flavoring component one or more flavorants releasably adsorbed on finely divided silica. Optionally, one or more sweeteners releasably adsorbed on finely divided silica is used as the sweetening component. The method extends the flavor, reduces plasticization of the gum by the flavorant, and retards or prevents oxidative degradation of the flavorant.

Another aspect of the present invention is a flavored confection, such as a solid or chewy candy or mint, comprising a flavoring component which consists of one or more flavorants adsorbed releasably on finely divided silica.

DETAILED DESCRIPTION OF THE INVENTION

The invention will first be described with respect to its embodiment in chewing gums. The chewing gum of the present invention comprises the gum base itself, optional solvents, and/or plasticizers. The amount of gum base employed will vary greatly depending on various factors such as the type of base used, consistency desired and other components used to make the final product. In general, amounts of about 5% to about 50% by weight of the final chewing gum composition are acceptable for use in the chewing gum compositions, preferred amounts thereof being about 15% to about 25% by weight. The gum base may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinyl acetate, and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins, or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene; and mixtures thereof. The solvent may be employed in an amount ranging from about 10% to about 75% and preferably about 45% to about 70% by weight to the gum base.

The gum base can also contain any of a variety of traditional ingredients such as plasticizers or softeners such as lanolin, stearic acid, sodium stearate, potassium stearate, glyceryl triacetate, glycerine and the like and/or waxes, for example, natural waxes, petroleum waxes, such as polyurethane waxes, paraffin waxes and microcrystalline waxes, to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include conventional additives such as emulsifiers such as lecithin and glyceryl monostearate; and additional fillers such as aluminum hydroxide, magnesium hydroxide, alumina, aluminum silicates, calcium carbonate, and talc and combinations thereof. These fillers may be used in the gum base in various amounts. Preferably the amount of fillers when used will vary from about 4 to about 30% by weight of the final chewing gum.

In those embodiments wherein the product is not a gum but a solid confection, the product comprises any conventional combination of ingredients including the sweeteners set forth herein, extenders, and flavorant as described herein.

The candy products to which the silica-adsorbed flavorants of this invention may be added include the compressed or pressed candy and mint varieties. These can be prepared by mixing sugar, water, and corn syrup to form a wet granulation. Colorants and active ingredients unaffected by temperatures used in subsequent drying procedures may be added at this point. The mass is then dried and screened to an appropriate particle size. Variations of this granulation procedure may be used to form the premix to which flavor(s) and a tablet lubricant, such as magnesium stearate, are added. This final mixture is introduced into a tablet machine to form the compressed candy. A typical pressed candy formula contains the following ingredients, in percent by weight, based on the weight of the total formulation:

| 75% | to | 98% | sugar |
|---|---|---|---|
| 1% | to | 20% | corn syrup |
| .1% | to | 4% | flavorant |
| 0% | to | 0.5% | colorant(s) |
| 0% | to | 5% | tableting lubricant |
| 0% | to | 5% | water |

Sugarless pressed candy may also be formulated to include the silica-adsorbed flavorants of this invention. For products of this type, which often contain powdered sorbitol instead of sugar, synthetic sweeteners are mixed with the powdered sorbitol and flavor(s), colorant(s) and a tablet lubricant are then added. The formula is introduced into a tablet machine to shape the final product. A typical sugarless pressed candy contains the following ingredients, in percent by weight, based on the weight of the total formulation:

| 98% | to | 99.5% | sorbitol |
|---|---|---|---|
| .1% | to | 4% | flavorant |
| 0% | to | 1.0% | synthetic sweeteners |
| 0% | to | 0.5% | colorant(s) |
| 0% | to | 2% | tableting lubricant |

The present invention contemplates the optional inclusion of a sweetener component which comprises any one or more sweeteners known in the art, including both natural and artificial sweeteners. Thus, sweeteners may be chosen from the following non-limiting list, which includes sugars such as sucrose, glucose, corn syrup, dextrose, invert sugar, fructose and mixtures thereof; saccharine and its various salts such as the sodium or calcium salt; cyclamic acid and its various salts such as the sodium salt; free aspartame; dihydrochalcone sweetening compounds; glycyrrhizin; *Stevia rebaudiana* (Stevioside); monellin, thalmatin, Sucralose, isomaltitol, neosugar, lactitol, polydextrose, and maltitol; and sugar alcohols such as sorbitol, sorbitol syrup, mannitol, xylitol, and the like. Also contemplated as a sweetener is the nonfermentable sugar substitute hydrogenated starch hydrolysate (also known as Lycasin) which is described in U.S. Pat. No. Re. 26,959. Also contemplated is the synthetic sweetener 3,6-dihydro-6-methyl-1-1,2,3-oxathiazin-4-one-2,2-dioxide, particularly the potassium (Acesulfame-K), sodium and calcium salts thereof as described in German Patent No. 2,001,017.7.

As indicated, products within the scope of the present invention may include no sweetener at all. If sweetener is included, the amount of sweetener is effective to provide the desired degree of sweetness, generally 0.001 to 70 wt. % of the final product.

Suitable flavorants include both natural and artificial flavors and mints, such as oil of peppermint, menthol, oil of spearmint, vanilla, oil of cinnamon, oil of wintergreen (methyl salicylate), and various fruit flavors, including but not limited to lemon oil, orange oil, grape flavor, lime oil, grapefruit oil, apple, apricot essence, and combinations thereof. The flavorings are generally utilized in amounts that will vary depending upon the individual flavor, and may, for example, range in amounts of about 0.5% to about 3% by weight of the final composition weight.

Colorants can be present in the chewing gums and confections of the present invention. Examples include the pigments such as titanium dioxide and other dyes suitable for food, drug and cosmetic applications known as F.D. & C. dyes, and the like. The materials may be incorporated in amounts of up to about 1% by weight, preferably up to about 6% by weight.

The flavoring component of the gums and confections of the present invention preferably consists of one or more of said flavorants adsorbed releasably on finely divided amorphous silica. This flavoring component, following preparation as described herein, is then incorporated with the other ingredients of the chewing gum or confection. Preferably, this flavoring component comprises about 0.005% to about 25% by weight of the final chewing gum or confection product. No other thermoplastic or thermosetting material, nor any suspending agent, filler, extender, nor entrapment agent, need be present in the sweetener component. This aspect of the present invention thus contributes ease and economy of formulation, with an unprecedented realization of benefits. In chewing gums and chewy (semisolid) confections, those benefits include unimpeded onset of flavor during the initial chew coupled with a prolonged extension of the flavor effect during chewing, all of which are realized together with the full, undegraded effect of the sweetener component. In solid candies and mints, those benefits include improved intensity and duration of flavor, as well as prolonged shelf life and reduced volatilization of flavor elements. Other benefits include lessening of the plasticization of the gum base by the flavorant, and retarded or eliminated oxidation of the flavorant.

Some, or all, of the sweetener used in the gums and confections of the present invention can also be in the form of a sweetening component in which one or more sweeteners is releasably adsorbed on finely divided silica. Preferably, the sweetener is one which is liquid at the conditions under which it is used to make such products. Sweeteners that are normally solids can be dissolved or suspended in a liquid which is thus adsorbed onto the finely divided silica. The resulting component can then be readily added to the other ingredients used in making the gum or confection. This aspect of the invention thus contributes ease and economy of formulation, as well as the unimpeded onset of the desired sweetness coupled with prolonged extension of sweetness.

Notably, the use of the silica-adsorbed flavoring component and sweetening component described herein permits attainment of a given level of flavor and sweetness perception with less flavorant or sweetener, as the case may be; that is, the availability of the flavorant and/or sweetener appears enhanced. Without being bound by any particular theory, it is believed that the flavorant or sweetener adsorbed on the silica is less likely to be masked within gum base, by absorption into the gum base or otherwise; under this theory, a greater proportion out of any total loading of flavor and sweetness is "available" for perception by the consumer.

In addition, particularly when the present invention is carried out using liquid flavorant syrups or solutions, the present invention permits the operator to avoid having to dry (spray-dry) the flavorant. This, in turn, reduces the cost of the operation and permits retention of the more volatile components of the flavorant, as drying generally requires the application of heat which would drive off the more volatile components and could even alter the structure of flavor components. As a result, the perceived flavor is stronger and fuller.

The finely divided silica used in this invention should be sufficiently finely divided such that: the flavorant and/or sweetener, as the case may be, adsorbs to the silica; the silica containing the material adsorbed thereon combines readily and homogeneously with the other components of the chewing gum or confection upon manufacture; an attractively high amount of flavorant and/or sweetener can be carried on a relatively small amount of silica; and the silica does not contribute any rough or gritty texture either visually or upon chewing. Thus, the finely divided silica useful in the present invention should be sufficiently finely divided to exhibit a surface area of about 200 to about 350 square meters per gram or more. One preferred silica product meeting the desired characteristics is "Syloid 244 FP", an amorphous silica aerogel marketed by W. R. Grace and Co., Baltimore, Md. This product has a surface area of about 310 square meters per gram.

Preparation of the silica-adsorbed flavoring component and sweetening component of the present invention requires intimate mixing of the silica with the material to be adsorbed thereon. Both flavorant and sweetener can be adsorbed onto the same batch of silica, but for fuller flexibility in formulating and for fuller perception of each component it is preferred that the flavorant and sweetener be adsorbed onto separate quantities of silica. Quantities of the flavorant and silica, and quantities of the flavorant and silica, are simply physically mixed together, without the need for any other additive and without the need to add any liquid. The result is a fine, dry powder which is easily incorporated together with the other ingredients of the chewing gum of the present invention.

Relative amounts of flavorant to silica and sweetener to silica can be adjusted depending on the desired taste characteristics of the final product. It is a significant and unexpected advantage of this invention that the advantages described herein can be realized over a wide range of ratios of flavorant to silica and sweetener to silica. Thus, for instance, the weight ratio of flavorant to silica and of sweetener to silica can be as low as 1:10 and can be as high as 1:1, 2:1 or even up to about 10:1. Higher loadings on the silica enhance the intensity and duration of the flavor and sweetener, as the case may be, in the chewing gum and confection. Preferably, the total amount of silica in the final product comprises not more than 2% of the final product. Preferably, the entire amount of any flavorant is adsorbed onto the silica, although this is not necessary.

The silica bearing the flavor, and/or the silica bearing the sweetener, can optionally be encapsulated before being incorporated into the final product. The objective of the encapsulation is to prolong further the duration of the perceived flavor and/or sweetness. Satisfactory materials for the encapsulation are thus any which form a coating on the loaded silica, and which are inert to the consumer. Examples include shellac, gelatin, polyvinyl acetate, elastomers, resins, zein, paraffin, fats and waxes. Encapsulating material may be hydrophobic or hydrophilic, and can comprise one or several layers of the same or different material. Encapsulation can be carried out using conventional powder-encapsulating equipment and procedures. It will thus be recognized that an emulsifier can be included in the encapsulating material to facilitate formation of the desired coating(s). Suitable emulsifiers have an HLB value of 2 to 13; examples include lecithin, polyglycerol esters, mono- and diglycerides, sorbitan monostearate, and polysorbate 60.

Chewing gums in accordance with the present invention are formulated in accordance with essentially conventional processing technology. Thus, preferably, the gum base including any resins, plasticizers, fillers and/or other gum base components are softened together by heating and then mixed together with the flavoring component and optional sweetening component, and the mixture is stirred together for a time sufficient to insure a homogenous mass. The mass can be formed into pellets or into slabs from which individual stick-type pieces are cut using technology familiar to those skilled in this art.

Confections, too, are prepared without need for any departure from conventional technology. The silica is added into the blend of ingredients as the ingredient otherwise would be, and the ingredients are blended and formed into the desired final form.

EXAMPLE

Gum samples were prepared from the components set forth in the following Table 1, and were then subjected to sensory testing.

TABLE 1

(all amounts in wt. %)

|  | Formula No. | | |
| --- | --- | --- | --- |
|  | 1 | 2 | 3 |
| Sorbitol Powder | 42.7 | 41.7 | 41.0 |
| Gum Base | 30.0 | 30.0 | 30.0 |
| Hydrogenated Glucose Syrup | 17.0 | 17.0 | 17.0 |
| Glycerin | 5.0 | 5.0 | 5.0 |
| Sorbitol Solution, 70% | 4.0 | 4.0 | 4.0 |
| Peppermint Oil | 1.0 | — | — |
| Peppermint Oil adsorbed on 310 $m^2$/g silica | | | |
| at 50/50 weight ratio | — | 2.0 | — |
| at 37 Pep. oil/ 63 silica weight ratio | — | — | 2.7 |
| Aspartame | 0.3 | 0.3 | 0.3 |
| Total | 100.0 | 100.0 | 100.0 |

The amounts of peppermint oil were the same in all three formulas. The flavor in the gums of formulas 2 and 3 had superior maximum intensity, significantly greater intensity, and significantly longer duration.

What is claimed is:

1. A flavored product which is a chewing gum or confection comprising as the flavoring component thereof, one or more flavorants adsorbed on finely divided amorphous silica, wherein said flavoring component is encapsulated, and wherein said one or more adsorbed flavorants are releasable from said product upon chewing of said product.

2. A chewing gum or confection according to claim 1 wherein the weight ratio of flavorant to silica in said flavoring component is at least about 1:10.

3. A chewing gum or confection according to claim 2 wherein the weight ratio of flavorant to silica in said flavoring component is from about 1:10 to about 10:1.

4. A chewing gum or confection according to claim 1 wherein the surface area of said silica is about 200 to about 350 square meters per gram.

5. A chewing gum or confection according to claim 1 wherein said flavorant is selected from the group consisting of peppermint oil, menthol, cinnamon oil, spearmint oil, vanilla, wintergreen oil, lemon oil, orange oil, grape, lime oil, grapefruit oil, apple, apricot essence, and mixtures thereof.

6. A chewing gum or confection according to claim 1, further comprising a sweetener.

7. A chewing gum or confection according to claim 6 wherein said sweetener is selected from the group consisting of sucrose, glucose, corn syrup, dextrose, invert sugar, fructose, saccharine, salts of saccharine, cyclamic acid, salts of cyclamic acid, aspartame, dihydrochalcones, glycyrrhizin, Stevia rebaudiana, monellin, thalmatin, Sucralose, isomaltitol, neosugar, lactitol, polydextrose, maltitol, sorbitol, sorbitol syrup, mannitol, xylitol, hydrogenated starch hydrolysate, Acesulfame, salts of Acesulfame, and mixtures thereof.

8. A chewing gum or confection according to claim 6 wherein at least a portion of said sweetener present therein is releasably adsorbed on finely divided silica.

9. A chewing gum or confection according to claim 7 wherein at least a portion of said sweetener present therein is releasably adsorbed on finely divided silica.

10. A chewing gum comprising:
    a gum base; and
    a flavoring component;
wherein said flavoring component consists essentially of one or more flavorants adsorbed on finely divided amorphous silica, wherein said flavoring component is encapsulated, and wherein said one or more adsorbed flavorants are releasable from said gum upon chewing of the gum.

11. A chewing gum according to claim 10 comprising about 5 to about 50 wt. % of said gum base, and about 0.005 to about 25 wt. % of said flavoring component.

12. A chewing gum according to claim 10 wherein the weight ratio of flavorant to silica in said flavoring component is at least about 1:10.

13. A chewing gum according to claim 12 wherein the weight ratio of flavorant to silica in said flavoring component is from about 1:10 to about 10:1.

14. A chewing gum according to claim 10 wherein the surface area of said silica is about 200 to about 350 square meters per gram or more.

15. A chewing gum according to claim 10 wherein said flavorant is selected from the group consisting of peppermint oil, menthol, cinnamon oil, spearmint oil, vanilla, wintergreen oil, lemon oil, orange oil, grape, lime oil, grapefruit oil, apple, apricot essence, and mixtures thereof.

16. A chewing gum according to claim 10, further comprising a sweetener.

17. A chewing gum according to claim 16 wherein said sweetener is selected from the group consisting of sucrose, glucose, corn syrup, dextrose, invert sugar, fructose, saccharine, salts of saccharine, cyclamic acid, salts of cyclamic acid., aspartame, dihydrochalcones, glycyrrhizin, Stevia rebaudiana, monellin, thalmatin, Sucralose, isomaltitol, neosugar, lactitol, polydextrose, maltitol, sorbitol, sorbitol syrup, mannitol, xylitol, hydrogenated starch hydrolysate, Acesulfame, salts of Acesulfame, and mixtures thereof.

18. A chewing gum according to claim 16 wherein at least a portion of said sweetener present therein is releasably adsorbed on finely divided silica.

19. A chewing gum according to claim 17 wherein at least a portion of said sweetener present therein is releasably adsorbed on finely divided silica.

20. A method of making chewing gum, comprising combining effective amounts of a gum base, a sweetener component and a flavoring component wherein said flavoring component consists essentially of one or more flavorants adsorbed on finely divided amorphous silica and wherein said flavoring component is encapsulated.

* * * * *